(12) United States Patent
Scholle et al.

(10) Patent No.: US 10,807,456 B2
(45) Date of Patent: Oct. 20, 2020

(54) TRANSMISSION ARRANGEMENT FOR A HYBRID VEHICLE, DRIVE ARRANGEMENT, METHOD FOR THE OPERATION THEREOF, AND HYBRID VEHICLE

(71) Applicant: AUDI AG, Ingolstadt (DE)

(72) Inventors: Tassilo Scholle, Ingolstadt (DE); Markus Störmer, Berching (DE); Thomas Hoffmann, Riedenburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/343,636

(22) PCT Filed: Oct. 24, 2017

(86) PCT No.: PCT/EP2017/077205
§ 371 (c)(1),
(2) Date: Apr. 19, 2019

(87) PCT Pub. No.: WO2018/077903
PCT Pub. Date: May 3, 2018

(65) Prior Publication Data
US 2019/0270371 A1 Sep. 5, 2019

(30) Foreign Application Priority Data
Oct. 26, 2016 (DE) .................... 10 2016 221 045

(51) Int. Cl.
*B60K 6/48* (2007.10)
*B60K 6/54* (2007.10)
(Continued)

(52) U.S. Cl.
CPC ............... *B60K 6/365* (2013.01); *B60K 6/48* (2013.01); *B60K 6/547* (2013.01); *F16H 3/725* (2013.01);
(Continued)

(58) Field of Classification Search
None
See application file for complete search history.

(56) References Cited

U.S. PATENT DOCUMENTS

| 5,433,282 A | 7/1995 | Moroto et al. |
| 2007/0032327 A1 | 2/2007 | Raghavan et al. |

(Continued)

FOREIGN PATENT DOCUMENTS

| DE | 102010035206 A1 | 3/2012 |
| DE | 102012001846 A1 | 8/2013 |

(Continued)

OTHER PUBLICATIONS

International Preliminary Report on Patentability and translation of Written Opinion dated May 9, 2019 in corresponding International Application No. PCT/EP2017/077205; 7 pages.
(Continued)

*Primary Examiner* — Colby M Hansen
(74) *Attorney, Agent, or Firm* — Maier & Maier, PLLC

(57) ABSTRACT

A transmission arrangement for a hybrid vehicle, in which a connection for an internal combustion engine, a connection for an electric machine and a transmission part of the transmission arrangement are arranged so as to be couplable to one another. Here, the transmission part includes a single Ravigneaux planetary gear set with two planetary transmissions and a single internal gear. The transmission part furthermore has two brakes and two clutches as frictionally locking shift elements. A drive arrangement having a transmission arrangement of this type and having in each case an internal combustion engine and electric machine connected thereto. Further, a method for operating a drive arrangement of said type, and a hybrid vehicle equipped with a drive arrangement of this type.

9 Claims, 2 Drawing Sheets

(51) Int. Cl.
*B60K 6/365* (2007.10)
*B60K 6/547* (2007.10)
*F16H 3/72* (2006.01)

(52) U.S. Cl.
CPC .............. *B60K 2006/4816* (2013.01); *F16H 2200/2005* (2013.01); *F16H 2200/2023* (2013.01); *F16H 2200/2041* (2013.01); *Y02T 10/62* (2013.01)

(56) References Cited

U.S. PATENT DOCUMENTS

| | | | | |
|---|---|---|---|---|
| 2012/0088621 A1* | 4/2012 | Kasuya | ................. | B60K 6/387 475/5 |
| 2014/0256490 A1* | 9/2014 | Honda | .................... | B60K 6/52 475/5 |
| 2015/0011352 A1* | 1/2015 | Beck | ........................ | F16H 3/62 475/275 |
| 2017/0066437 A1* | 3/2017 | Yamamoto | .............. | B60K 6/48 |

FOREIGN PATENT DOCUMENTS

| | | |
|---|---|---|
| DE | 102014201254 A1 | 8/2015 |
| DE | 102014223339 A1 | 5/2016 |
| DE | 102014223340 A1 | 5/2016 |
| EP | 3072724 A1 | 9/2016 |
| FR | 3026062 A1 | 3/2016 |
| JP | 2010-95066 A | 4/2010 |
| WO | 2016/075334 A1 | 5/2016 |
| WO | 2016/075335 A1 | 5/2016 |
| WO | 2016/075336 A1 | 5/2016 |
| WO | 2016/075337 A1 | 5/2016 |

OTHER PUBLICATIONS

German Search Report dated Jun. 23, 2017 in corresponding German Application No. 102016221045.9; 14 pages.

International Search Report and Written Opinion dated Jan. 26, 2018 in corresponding International Application No. PCT/EP2017/077205; 32 pages.

* cited by examiner

|      | K1 | K2 | B1 | B2 | i     |
|------|----|----|----|----|-------|
| V1   | x  |    | x  |    | 12,03 |
| V2   | x  |    |    | x  | 8,20  |
| V3   | x  | x  |    |    | 5,85  |
| V4   |    | x  |    | x  | 3,63  |
| E1   |    |    | x  |    | 14,54 |
| E2   |    |    |    | x  | 9,90  |
| eCVT |    | x  |    |    |       |
| SL   | x  |    |    |    |       |

Fig.3

TRANSMISSION ARRANGEMENT FOR A HYBRID VEHICLE, DRIVE ARRANGEMENT, METHOD FOR THE OPERATION THEREOF, AND HYBRID VEHICLE

FIELD

The invention relates to a transmission arrangement for a hybrid vehicle, in which a connection for an internal combustion engine, a connection for an electric machine and a transmission part including a Ravigneaux planetary gear set are arranged so as to be couplable to one another. The invention further relates to a drive arrangement, a method for operating such a drive arrangement, and a hybrid vehicle having such a drive arrangement. To simplify, the term "Ravigneaux set" will be used hereinafter instead of the term "Ravigneaux planetary gear set." Multiple-speed hybridized transmissions which can be mechanically coupled to an internal combustion engine and an electric machine are known from prior art.

BACKGROUND

DE 10 2014 223 339 A1 discloses a torque transmission device and a method for the operation thereof. The device is particularly intended for a motor vehicle and comprises an input shaft, which can be rotationally connected to an internal combustion engine, two planetary gear sets, an output shaft, an electric machine, a braking mechanism, and three disconnect clutches. Each of the two planetary gear sets has its own internal gear.

DE 10 2014 201 254 A1 discloses a transmission arrangement and a drive train for a hybrid vehicle and a respective hybrid vehicle. The transmission arrangement includes an electric machine which is connected to an input shaft, an internal combustion engine input shaft which can be connected to an internal combustion engine, an output shaft and a Ravigneaux set; the planet carrier of which can be fastened to a transmission housing by means of a brake. The transmission arrangement is characterized by a shiftable clutch arrangement, by means of which the planet carrier and a second sun of the Ravigneaux set and the internal combustion engine input shaft can be selectively coupled in a torque-transmitting manner. The transmission arrangement further comprises an auxiliary shaft, which passes longitudinally through the transmission arrangement as a coaxial central shaft. The auxiliary shaft is in interaction with the brake on the one hand and with the shiftable clutch arrangement on the other hand. This particularly allows connecting the internal combustion engine input shaft, a shaft of the second sun, and the auxiliary shaft in pairs. It is also possible to connect all three shafts simultaneously. Furthermore, there is a neutral position, such that the shiftable clutch unit can be used to implement five shift positions.

SUMMARY

It is the problem of the present invention to facilitate efficient and convenient operation of a hybrid vehicle.

In the transmission arrangement according to the invention for a hybrid vehicle, a connection for an internal combustion engine, a connection for an electric machine, and a transmission part are arranged so as to be couplable to one another. The transmission part includes a first and a second clutch, a first and a second brake, and a Ravigneaux set. The latter is composed of exactly one internal gear, a first and second sun gear, and a first and second planetary gear set and a planet carrier to which the planetary gear sets are rotatably mounted. As usual, one sun gear and a planetary gear set, the two planetary gear sets, as well as one of the planetary gear sets and the surrounding internal gear mesh with each other. The connection for an internal combustion engine can be coupled to the first sun gear via the first clutch and to the planetary carrier via the second clutch. "Couplable" or "can be coupled" means in this context that the coupling state is dependent on the switching state of the respective clutch. The connection to an electric machine is mechanically coupled to the first sun gear and can be coupled to the connection for the internal combustion engine via the first clutch. The first brake is configured for releasable fixing of the planetary carrier and the second brake is configured for releasable fixing of the second sun gear. The internal gear forms an output drive of the transmission arrangement or can be coupled, connected, or rotatably connected in a torque-transmitting manner to a drive.

According to the present invention, a hybrid vehicle particularly means a motor vehicle which comprises an internal combustion engine and an electric machine—particularly an electric motor—and can be driven by means of the internal combustion engine and/or the electric motor for advancement of the hybrid vehicle. The connections for the internal combustion engine and the electric machine may for example include respective shafts or receptacles for respective shafts. The connection for the internal combustion engine can particularly be provided and adapted for connecting to a crankshaft of the internal combustion engine in a torque-transmitting manner. The connection for the electric machine may particularly be provided and/or adapted for connecting to the rotor shaft of the electric machine.

But this is not meant to rule out here that other components may be provided or disposed between the internal combustion engine and the transmission part and/or between the electric machine and the transmission part. According to the present invention, a couplable arrangement or couplability of two components particularly means that the two components are arranged and/or adapted such that a mechanical connection, particularly an uninterrupted, continuous, or end-to-end connection, can be established between the two components by means of an intended switching or operating process of a switching member, said connection particularly being suitable for transmitting rotational movements, torques, and/or forces between the two components. Such a connection may herein be established or released, for example, depending on the positions of the first and/or the second clutches.

The mechanical coupling of the electric machine to the first sun gear, however, is not achieved via or by means of a clutch. Instead, there is a direct or indirect, but in any case a continuous or end-to-end mechanical connection or rotary connection for transmitting a torque between the electric machine or the rotor shaft of the electric machine and the first sun gear. It should further be clarified here that a connection or coupling of a component or to a component can particularly refer to a respective shaft or axis of the respective component. It therefore goes without saying that the electric machine, for example, is not mechanically coupled to any point of the first sun gear but to its shaft or axis of rotation. A person skilled in the art will clearly derive and understand from the respective context when a term denoting a component means the component as a whole or in general and when it particularly means the shaft or axis thereof. This can particularly apply to gear wheels, rotating or rotatable components and terms, such as the internal gear, the first sun gear, the second sun gear, a planetary gear or a planetary gear set, the electric machine and/or the internal combustion engine.

The transmission arrangement according to the invention can advantageously be inserted in or used for a drive train of a hybrid vehicle and in that case enables various drive or operating modes of said hybrid vehicle. These may include, for example, purely electric driving, purely internal combustion engine driving, and/or a hybrid drive or driving operation, wherein in the latter mode a torque or drive moment can be produced or contributed both by the internal combustion engine and by the electric machine. But there may also be a driving or operating mode in which the electric machine is run as a generator. The transmission arrangement can for this purpose be adapted and/or switched such that an axle, shaft, or receptacle rotating in a respective direction or rotation is provided at the connection for the electric machine.

The composition or structure of the transmission arrangement described results particularly advantageously in minimum component and production expenditure, which advantageously allows saving or minimizing costs and weight. It is particularly advantageous that just one internal gear and one electric machine or the use of exactly one internal machine is needed or provided in or at the transmission arrangement. The configuration of the transmission arrangement for operation using an internal combustion engine and an electric machine, particularly the connection of the electric machine to the transmission arrangement, facilitates a significant reduction in fuel consumption and emissions in a particularly advantageous manner when operating or driving the hybrid vehicle compared to a motor vehicle equipped with a conventional drive train. Furthermore, the transmission arrangement according to the invention allows the implementation of a particularly favorable distribution of speeds and transmission ratios, which result in improved, comfortable, and economical driving and starting. In addition, respective stresses on components and the resulting wear can be kept low or minimized particularly advantageously because switching members and gear components experience particularly low speed and torque loads during the operation of the transmission arrangement. This advantageously allows a more lightweight, lower-cost, more compact, and more durable design of the transmission arrangement according to the invention compared to similar conventional or prior art transmission arrangements.

In another embodiment of the invention, the transmission arrangement has eight operating modes or speeds. These include herein four internal combustion engine or hybrid operating modes, two electric motor operating modes, one variable driving range (electronic continuously variable transmission or eCVT operating mode), and a parked charging operating mode. In the internal combustion engine or hybrid operating modes, a portion of the driving power for the hybrid vehicle can be provided using the internal combustion engine, wherein the electric machine can contribute thereto or provide another portion thereof. In the electric motor operating modes, the driving power used for advancing the hybrid vehicle is exclusively generated or provided by the electric machine. In the eCVT operating mode, the internal combustion engine and the electric machine can for example each specify or set or be used to specify or set a rotational speed, which, in a self-adjusting manner, results in an output speed and/or output torque at the output of the transmission arrangement. The drive torque used for advancing the hybrid vehicle can completely or for the most part be generated or provided by the internal combustion engine. The electric machine can be operated as a generator or as a motor depending on the actual rpm range. The direction of rotation of the electric machine can be either positive or negative depending on the rotational speed, due to a specific connection of the planetary gear sets or the Ravigneaux set. This means that the electric machine has generator and motor operating ranges depending on the direction of rotation.

The eCVT operating mode or gear can thus be utilized as a full-fledged gear or a travel gear. This is particularly possible if a traction battery of the hybrid vehicle, which is electrically connected to the electric machine, is empty or cannot deliver sufficient voltage or power for driving the hybrid vehicle.

The transmission arrangement is preferably configured and constructed such that the transmission ratio in the eCVT mode is relatively short, thus providing or making available a particularly great tractive force for driving and starting. This advantageously allows comfortable and reliable driving and starting of the hybrid vehicle, particularly in a loaded state, e.g. loaded with a towed load. When the electric machine works as a generator, it can charge the traction battery of the vehicle. This can advantageously result in an increase or extension of a range of the vehicle. Advantageously, the eCVT operating mode can be configured for stop-and-go operation or crawling.

In the parked charging operating mode, the electric machine, as a generator supplied or driven by the internal combustion engine, can be operated for charging the traction battery or another energy storage device or for generating a use voltage at an electric output or outlet. In this mode, the internal combustion engine can be operated continuously in a particularly efficient range or state.

The transmission arrangement according to the invention thus provides particularly flexible operating modes which are suitable for differing driving and operating situations. The particularly advantageous transmission ratios and the comprehensive and flexibly usable selection of operating modes allow a particularly advantageous overall use of the transmission arrangement, particularly with respect to achievable values of a power spectrum, a torque spectrum, a rotational speed, and an overall efficiency of a drive train of the hybrid vehicle or the entire hybrid vehicle, respectively.

In another embodiment of the present invention, the transmission arrangement comprises two electric motor operating modes, wherein a ratio of their transmission ratios is less than 2.5, preferably between 1 and 2, particularly preferably between 1.2 and 1.8. The increment between the two electric motor operating modes is relatively small here. This advantageously allows particularly good driving and shifting and particularly high efficiency in operating the transmission arrangement and/or the hybrid vehicle. Advantageously, an available rpm range the electric machine can be optimally utilized. The two electric motor operating modes mentioned may be the two electric motor operating modes mentioned in conjunction with claim 2 or correspond to these modes.

In another embodiment of the present invention, the transmission arrangement comprises an eCVT operating mode in which an electric machine connected to a connection for an electric machine can be operated as a generator or as a motor depending on rotational speed. This eCVT operating mode or gear can be the eCVT operating mode which is described in conjunction with claim 2 or correspond to the same.

In another embodiment of the present invention, the connection for the internal combustion engine is coupled to the transmission part via a damper flywheel, particularly a dual-mass flywheel. The damper flywheel can also be arranged on a side of the connection of the internal combustion engine facing away from the transmission part. A primary inertia mass of the damper flywheel can be arranged on a side facing the internal combustion engine to be connected or connectible and a secondary inertia mass of the damper flywheel can be arranged on the side facing the transmission part. This arrangement favorably increases a mass moment of inertia of the rotating transmission components. The two inertia masses can for example be connected by respective spring members, whereby a resonant frequency of the damper flywheel can advantageously be significantly reduced. This can prevent or minimize an excitation, particularly by an idling speed, but also by a traveling rotational speed of the internal combustion engine or potentially exciting engine orders. The use of the dual-mass flywheel particularly advantageously allows decoupling of torsional vibrations of the internal combustion engine from the drive train efficiently and with a small number of components; advantageously, an additional damping element can be eliminated.

In another embodiment of the present invention, the connection for an electric machine is coupled to the transmission part via a spur gear stage. The spur gear stage may include a gear wheel configured as a spur gear or multiple gear wheels configured as spur gears. The spur gear stage allows a flexible or adjusted spatial arrangement of the electric machine relative to the transmission part. This allows for a particularly compact arrangement, minimizing the overall installation space needed for the drive train of the hybrid vehicle. Specifically, it is not necessary to arrange the electric machine such that its rotor shaft is in alignment in the longitudinal direction with a shaft of the transmission part. As an alternative to the spur gear stage, a chain, a toothed belt, or a similar means for transmitting and/or deflecting a moment between the rotating machine and the transmission arrangement may be used. In addition, the spur gear stage allows optimum adjustment to an rpm range of the electric machine which is provided, available, or optimal with respect to efficiency.

In another embodiment of the invention, the connection for the electric machine is spatially arranged such that, when connecting an electric machine thereto, a rotor shaft of the connected electric machine is arranged truly parallel to a shaft of the Ravigneaux set and a driven axle of the hybrid vehicle. This allows a particularly compact and space-saving arrangement. Such an arrangement can also be called a transverse transmission or transverse concept and can be specifically advantageously used whenever the installation space in the axial direction is limited in the respective hybrid vehicle.

A drive arrangement according to the invention includes a transmission arrangement according to the invention as well as an internal combustion engine and an electric machine. The internal combustion engine is connected as intended to the connection for the internal combustion engine of the transmission arrangement, particularly in a shiftable torque-transmitting manner, and the electric machine is connected as intended to the connection for the electric machine of the transmission arrangement. A torque can also be transmitted via said connection of the electric machine. In other words, what is provided is an overall arrangement of the transmission arrangement and one of the internal combustion engine and electric machine rotatably connected thereto.

A method according to the invention for operating a drive arrangement according to the invention, which includes a transmission arrangement according to the invention, can include one or several or all of the following eight process steps or processes. These may also be combined and/or executed or performed in any desired sequence. For a first internal combustion engine or hybrid operating mode, the first clutch is closed and the first brake is blocked. For a second internal combustion engine or hybrid operating mode, the first clutch is closed and the second brake is blocked. For a third internal combustion engine or hybrid operating mode, the first and the second clutches are closed. For a fourth internal combustion engine or hybrid operating mode, the second clutch is closed and the second brake is blocked. For a first electric motor operating mode, the first brake is blocked. For a second electric motor operating mode, the second brake is blocked. For a eCVT operating mode, the second clutch is closed. For a parked charging operating mode, the first clutch is closed.

According to these process steps or processes, the switching elements not mentioned, i.e. the respective brakes and/or clutches not mentioned, are open. An open brake is switched or set up to allow a component to rotate freely, which component could be fixed if the brake were closed or blocked. An open clutch is switched, arranged, or set up such that the components which can be coupled via this clutch, if rotating, will neither transmit such rotation nor a moment to each other or to the respective other component. Furthermore, according to the present invention, closing a brake of the transmission arrangement will only fix or block exactly one component. For example, blocking or closing the second brake only fixes, holds, or blocks the second sun gear but no other rotatable component, particularly no other rotatable axle or shaft and no other gear wheel of the transmission arrangement. Likewise, only the two components mentioned can be coupled directly via the two clutches of the transmission arrangement.

A hybrid vehicle according to the invention includes a drive arrangement according to the invention, which itself includes a transmission arrangement according to the invention.

The embodiments described above and below and the respective advantages of the transmission arrangement according to the invention, the method according to the invention for operating a drive arrangement according to the invention, and the hybrid vehicle according to the invention are in spirit mutually transferable or exchangeable. This applies particularly to components and means usable or used for performing the method according to the invention.

BRIEF DESCRIPTION OF THE DRAWINGS

Other features, details, and advantages of the invention can be derived from the description of preferred embodiments below and based on the drawing. Wherein:

FIG. 3 shows an overview table of possible shifting modes of a transmission arrangement with respective switching states of switching members of the transmission arrangement and respective exemplary transmission ratios.

DETAILED DESCRIPTION

Figure 1:
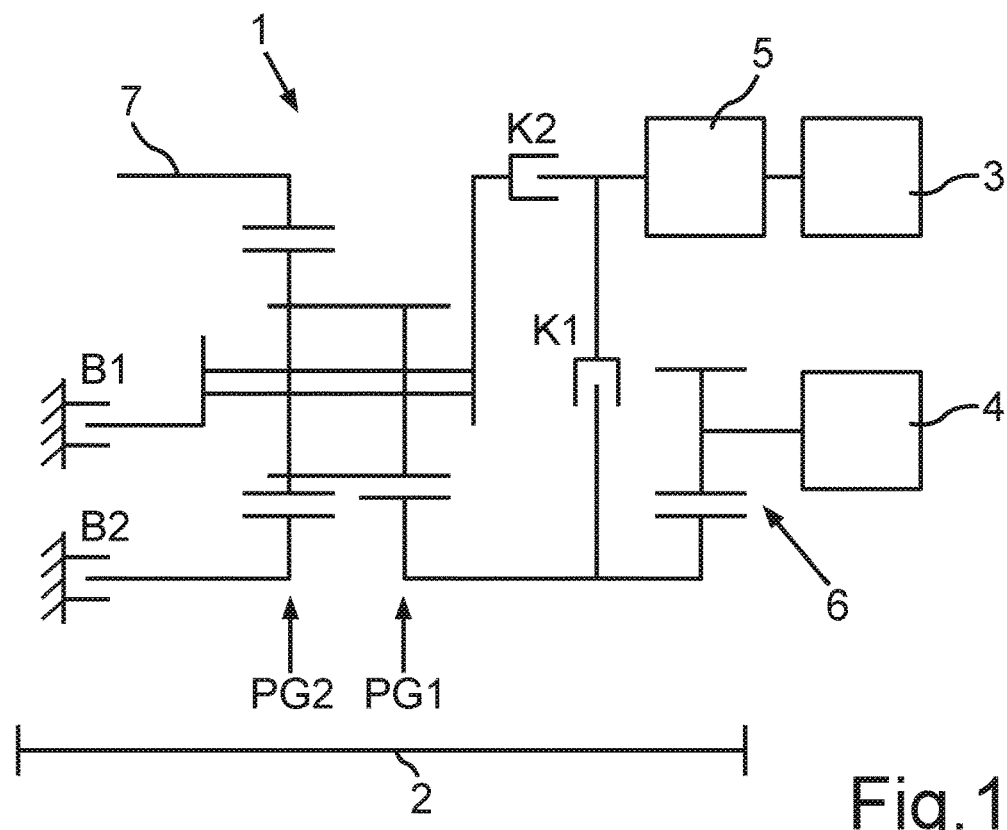
FIG. 1 shows a schematic view of a structure of a drive arrangement according to an embodiment of the invention.

FIG. 1 shows a schematic view of a structure of a drive arrangement 1, which is comprised or composed of a transmission arrangement 2, an internal combustion engine 3, and an electric machine 4. The internal combustion engine 3 is in this view connected to the transmission arrangement 2 via a damper flywheel, which herein is configured as a dual-mass flywheel 5. The electric machine 4 is herein connected to the transmission arrangement 2 via a spur gear stage 6.

The transmission arrangement 2 includes a basic Ravigneaux set having a first planetary gear PG1 and a second planetary gear PG2. The first planetary gear PG1 includes a first sun gear or a first sun and a first planetary gear set. The second planetary gear PG2 includes a second sun gear or a second sun and a second planetary gear set. The Ravigneaux set in addition includes a planetary carrier to which the two planetary gear sets are rotatably mounted or supported, and an internal gear meshed with the second planetary gear set, that is, the planetary gear set of the second planetary gear PG2. The planetary gear set of the first planetary gear PG1 will hereinafter be called the first planetary gear set and the planetary gear set of the second planetary gear PG2 will hereinafter be called the second planetary gear set. The two planetary gear sets may preferably include three planetary gears each. This can result in an optimum balance between a transferable moment and an installation space or design requirement of the planetary gears PG1, PG2.

It should be emphasized that the Ravigneaux set comprises just a single internal gear. This internal gear is herein connected to an output shaft or output 7 of the transmission arrangement 2 or the drive arrangement 1, respectively. In other words, an output or drive torque is provided via the internal gear, which torque is then transmitted to a driven axle or a driven wheel of the hybrid vehicle.

The transmission arrangement further includes four frictional switching members, namely, a first clutch K1, a second clutch K2, a first brake B1, and a second brake B2. The two clutches K1, K2 may for example be configured as wet multi-plate clutches or dry disc clutches. All four switching members K1, K2, B1, B2 can be switched or set reversibly between an open and a closed state or switching state.

The first brake B1 can be used herein to fix, hold, or block the planetary carrier of the Ravigneaux set. The second brake can be used to fix, hold, or block the second sun gear, that is, the sun gear of the second planetary gear PG2. The internal combustion engine 3 can be coupled to the first sun gear, that is, the sun gear of the first planetary gear PG1, via the first clutch K1 by means of the dual-mass flywheel 5. The electric machine 4 is also coupled or connected to the first sun gear by means of the spur gear stage 6. Accordingly, closing the first clutch K1 can establish a torque-transmitting mechanical coupling or connection of the internal combustion engine 3 and the electric machine 4. The electric machine 4 is connected to the first sun gear without a clutch in between. This clutch-free connection of the electric machine 4 is a connection or rotary connection which is permanent at least in operation, wherein the electric machine 4 can of course be removed from the drive arrangement 1 in a non-destructive and reversible manner and thus be disconnected from the transmission arrangement 2. The internal combustion engine 3 can be coupled to the planetary carrier via the second clutch K2—again by means of the dual-mass flywheel 5.

The structure or design of the transmission arrangement 1 described with reference to FIG. 1 can also be comprehended based on a schematic view of a possible layout of the drive arrangement 1 shown in FIG. 2. It shows the components shown and explained in FIG. 1 in an alternative representation and identified by the same reference symbols. The spur gear stage 6, which in this case includes three gear wheels, is shown in greater detail herein. The spur gear stage 6 advantageously makes it possible to arrange the electric machine 4 relative to the transmission arrangement 2 such that a rotor shaft 8 of the electric machine 4 is arranged truly parallel to a central shaft of the Ravigneaux set. The compact layout of the drive arrangement 1 shown here results therefrom. The rotor shaft 8 is also arranged axially parallel, that is, parallel to an axle or shaft of the output side or to the axle of the hybrid vehicle driven by the drive arrangement 1.

The output 7 or components connected to the internal gear on the output side are shown in somewhat greater detail as well. As shown herein, other gear wheels and a schematically outlined differential transmission can be arranged on the side of the internal gear facing away from the planetary gears PG1, PG2.

Figure 2:
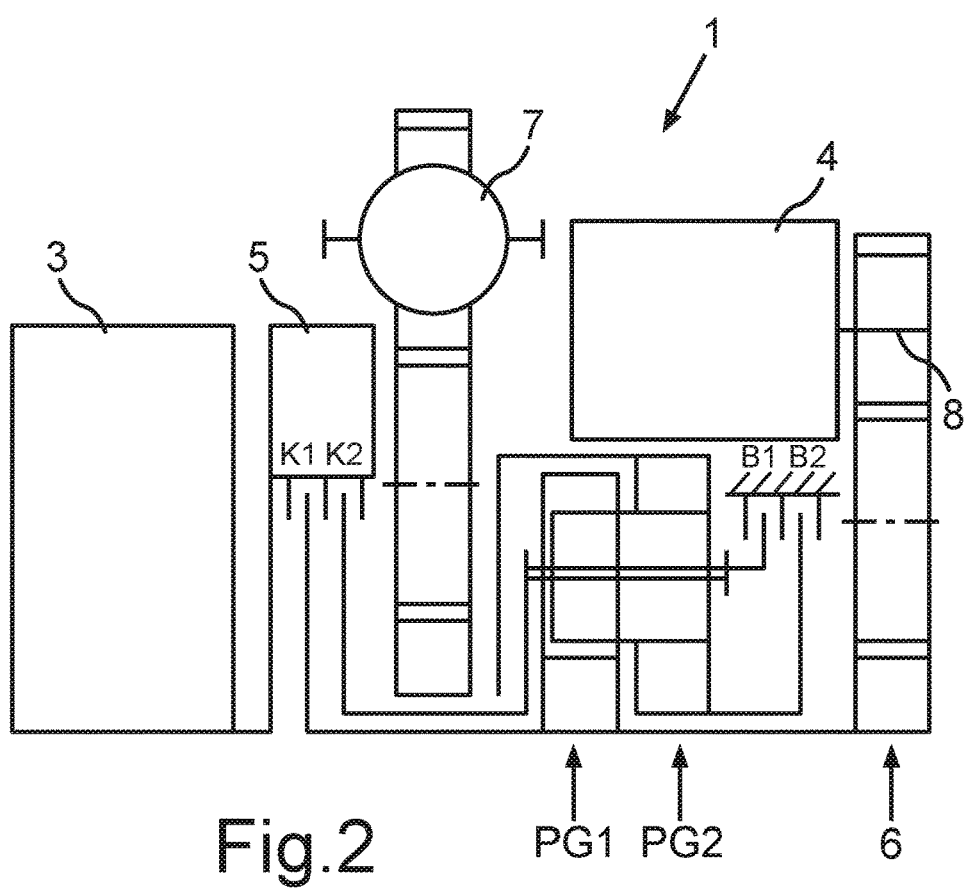
FIG. 2 shows a schematic view of an implementation of the structure from FIG. 1.

Apart from a gear wheel of the spur gear stage 6 identified by a dash and dot line and the gear wheel arrangement on the output side, the embodiment shown in FIG. 2 outlines rotating or rotatable components, particularly gear wheels, by just a horizontal line. This halved representation results in improved clarity and identifiability.

FIG. 3 shows an overview table of available operating modes or gears of the drive arrangement 1 shown in FIGS. 1 and 2. These operating modes are listed in the vertical direction one below the other in a head column of the table. A head row of the table lists the four frictional switching members K1, K2, B1, B2. In addition, a last column of the table gives examples of a potential respective transmission ratio i of each operating mode. It should be noted that the transmission ratio details provided are not necessary ratios or ratios to be complied with for the transmission arrangement to work. Other transmission ratios can be implemented which clearly deviate from the values provided herein. Adjustment or variation of the respective transmission ratios may particularly be specified and/or necessary depending on a respective vehicle, engine, or tire size.

In a first internal combustion engine gear V1, the first clutch K1 and the first brake B1 are closed. This is indicated by the markings x in the various cells V1-K1 and V1-B1. The two empty cells in the row of the first internal combustion engine gear V1, that is, cells V1-K2 and V1-B2, show that the second clutch K2 and the second brake B2 are released or open. The other table entries should be read similarly. In this case, the internal combustion engine 3 and the electric machine 4 are coupled in a torque-transmitting manner to the first sun gear, wherein the planetary carrier is fixed, held, or fastened by the closed first brake B1. Inevitably, the second clutch K2 must be open to prevent the transmission of a torque from the internal combustion engine to the fixed planetary carrier. The resulting transmission ratio may be 12.03, for example.

In a second internal combustion engine gear V2, the first clutch K1 and the second brake B2 are closed. Here as well, the internal combustion engine 3 and the electric machine 4 are coupled in a torque-transmitting manner to the first sun gear, wherein now the second sun gear is held by the second brake B2 and the planetary carrier can rotate. The resulting transmission ratio for the second internal combustion engine gear V2 is 8.20, for example.

In a third internal combustion engine gear V3, the two clutches K1 and K2 are closed, which results in a transmission ratio of 5.85, for example. The internal combustion engine 3 transmits a torque to the planetary carrier via the second clutch K2 and to the first sun gear via the first clutch K1. The Ravigneaux set is thus locked or rotates as a block. This is an advantageous, particularly efficient state or operation because there are no rotating or rolling components, particularly gear wheels.

In the three internal combustion engine gears V1, V2, V3, the internal combustion engine 3 and the electric machine 4 are operated in parallel, that is, both the internal combustion engine 3 and the electric machine 4 can contribute to an overall drive torque.

In a fourth internal combustion engine gear V4, the second clutch K2 and the second brake B2 are closed. The drive torque is on the one hand provided by the internal combustion engine 3 via the planetary carrier of the Ravigneaux set, on the other hand it is combined by the electric machine 4 via a respective transmission ratio. The transmission ratio can be determined or specified by a configuration of the Ravigneaux set. The resulting transmission ratio for the fourth internal combustion engine gear V4 is 3.63, for example.

Boost or recuperation operation of the electric machine 4 can be performed in gears V1, V2, V3, V4. In boost operation, the hybrid vehicle is driven by the internal combustion engine 3 and the electric machine 4, as described in the respective passages herein. Recuperation can be performed by analogous operation of the electric machine 4.

In a first electric motor gear E1, only the first brake B1 is closed, such that only the planetary carrier is fixed. In a second electric motor gear E2, only the second brake B2 is closed, such that only the second sun gear is fixed. This means that the first and second clutches K1, K2 are open in both electric motor gears E1, E2, such that the internal combustion engine 3 is decoupled from the transmission arrangement 2. The entire drive torque in the two electric motor gears E1, E2 is thus provided by the electric machine 4. It follows from the previously selected transmission ratios of the first electric motor gear E1 of 14.54 and the second electric motor gear E2 of 9.90 that the increment between the two electromagnetic gears is about 1.47, which advantageously results in particularly excellent driving and shifting and efficiency.

In an eCVT gear, only the second clutch K2 is closed. The electric machine 4 can be operated as a generator or as a motor in this operating mode. The electric machine 4 supports the torque applied by the internal combustion engine 3 to the Ravigneaux set as a generator or as a motor. This creates a torque balance in the first planetary gear set and allows a power split. In other words, a traction battery of the hybrid vehicle connected to the electric machine 4 can be charged in the eCVT operating mode even when the hybrid vehicle is traveling.

In a parked charging gear SL, only the first clutch K1 is closed. This means that the internal combustion engine is coupled in a torque or power-transmitting manner to the electric machine 4 via the first clutch K1. In this operating mode, the electric machine 4 is also operated as a generator, for example for charging the traction battery of the hybrid vehicle. Unlike in eCVT operating mode, the hybrid vehicle is parked in the SL operating mode and not driven or moved. This operating mode can be used for particularly efficient range extension of the hybrid vehicle. The Ravigneaux set runs powerless or load-free, such that the output 7 is load-free as well and there are no influences or effects on the operation of the drive arrangement 1 or the driven axle or driven wheel of the hybrid vehicle. For this purpose, specifically the brakes B1, B2 are open, such that the Ravigneaux set does not support a torque. Only drag losses are effective.

All in all, the arrangement and connection described results in a particularly uniform intervals between the individual gears. The transmission ratios listed in the table of FIG. 3 result in intervals between 1.4 and 1.61 between each two of the internal combustion engine gears V1, V2, V3, V4, whereas an interval within the same range of approximately 1.47 results for the electric motor gears E1, E2.

The invention claimed is:

1. A transmission arrangement for a hybrid vehicle, comprising:
   a connection for an internal combustion engine, a connection for an electric machine and a transmission part are arranged so as to be couplable to one another, wherein
   the transmission part includes a first and a second clutch, a first and a second brake as well as a Ravigneaux planetary gear set, wherein said Ravigneaux planetary gear set is composed of exactly one internal gear, a first and a second sun gear, a first and a second planetary gear set, and a planetary carrier to which the two planetary gear sets are rotatably mounted,
   the connection for the internal combustion engine can be coupled to the first sun gear via the first clutch and to the planetary carrier via the second clutch,
   the connection to an electric machine can be mechanically coupled to the first sun gear and can be coupled to the connection for the internal combustion engine via the first clutch,
   the first brake is adapted for releasably fixing the planetary carrier,
   the second brake is adapted for releasably fixing the second sun gear, and
   the internal gear forms an output of the transmission arrangement, wherein
   the transmission arrangement has eight operating modes, including
   four internal combustion engine or hybrid operating modes,
   two electric motor operating modes,
   an eCVT operating mode, and
   a parked charging operating mode for charging a traction battery of the hybrid vehicle which is electrically connected to the electric machine.

2. The transmission arrangement according to claim 1, wherein the transmission arrangement includes two electric motor operating modes, wherein a ratio of their transmission ratios is less than 2.5, preferably between 1.2 and 1.8.

3. The transmission arrangement according to claim 1, wherein the transmission arrangement includes an eCVT operating mode in which, if the electric machine is connected to the connection for the electric machine, said machine is operated as a generator or as a motor.

4. The transmission arrangement according to claim 1, wherein the connection for the internal combustion engine is coupled to the transmission part via a damper flywheel.

5. The transmission arrangement according to claim 1, wherein the connection for the electric machine is coupled to the transmission part via at least one spur gear stage.

6. The transmission arrangement according to claim 5, wherein the connection for the electric machine is spatially arranged such that, when connecting the electric machine thereto, a rotor shaft of the connected electric machine is arranged truly parallel to a shaft of the Ravigneaux planetary gear set and a driven axle of the hybrid vehicle.

7. A drive arrangement, including a transmission arrangement according to claim 1 and an internal combustion engine connected to the connection for an internal combustion engine, and an electric machine connected to the connection for an electric machine.

8. A method for operating a drive arrangement according to claim 7, comprising:
for a first internal combustion engine or hybrid operating mode, the first clutch is closed and the first brake is blocked, and/or
for a second internal combustion engine or hybrid operating mode, the first clutch is closed and the second brake is blocked, and/or
for a third internal combustion engine or hybrid operating mode, the first clutch and the second clutch are closed, and/or
for a fourth internal combustion engine or hybrid operating mode, the second clutch is closed and the second brake is blocked, and/or
for a first electric motor operating mode, the first brake is blocked, and/or
for a second electric motor operating mode, the second brake is blocked, and/or
for an eCVT operating mode, the second clutch is closed, and/or
for a parked charging operating mode, the first clutch is closed.

9. A hybrid vehicle having a drive arrangement according to claim 7.

* * * * *